Figure 4:
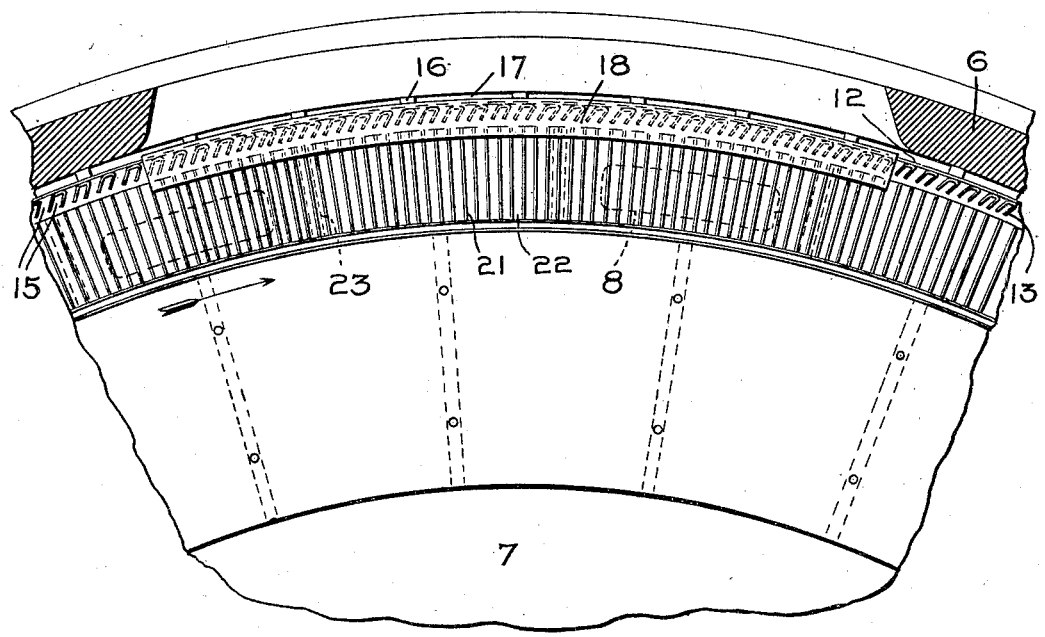

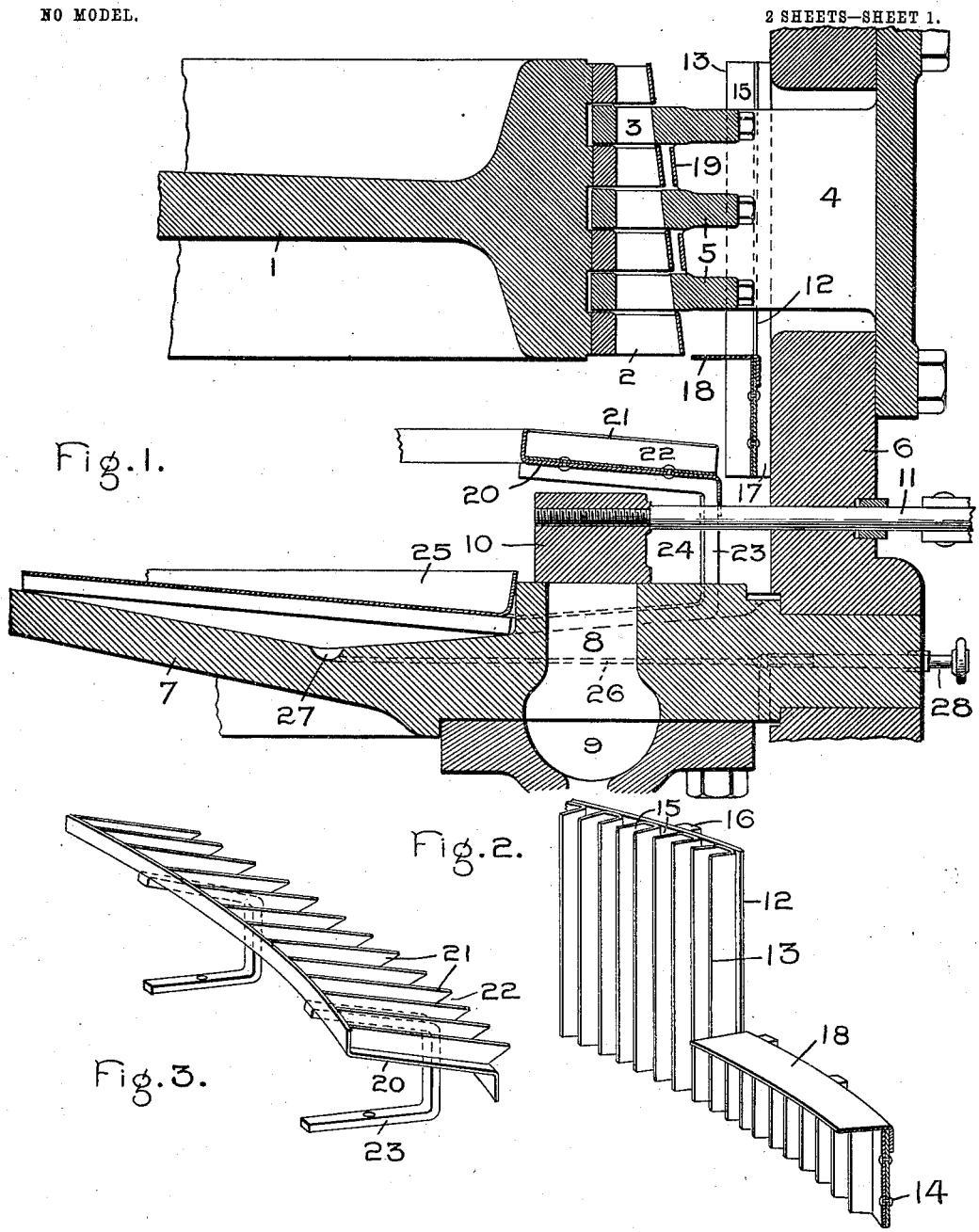

No. 745,045. PATENTED NOV. 24, 1903.
W. L. R. EMMET.
MEANS FOR SEPARATING MOISTURE FROM VAPOR IN TURBINES.
APPLICATION FILED JUNE 22, 1903.
NO MODEL. 2 SHEETS—SHEET 2.

Witnesses:
Marcus L. Byng
Alex F. Macdonald

Inventor
William L. R. Emmet,
by Albert G. Davis
Att'y.

No. 745,045. Patented November 24, 1903.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

MEANS FOR SEPARATING MOISTURE FROM VAPOR IN TURBINES.

SPECIFICATION forming part of Letters Patent No. 745,045, dated November 24, 1903.

Application filed June 22, 1903. Serial No. 162,526. (No model.)

*To all whom it may concern:*

Be it known that I, WILLIAM L. R. EMMET, a citizen of the United States, residing at Schenectady, in the county of Schenectady, State of New York, have invented certain new and useful Improvements in Means for Separating Moisture from Vapor in Elastic-Fluid Turbines, of which the following is a specification.

When elastic-fluid turbines, particularly of the jet type, are in operation, a considerable amount of moisture in the form of small particles is present in the steam or other motive fluid, a part of which was contained in the steam initially, while the remainder is due to expansion and condensation. The presence of moisture in the vapor is objectionable, because it decreases the efficiency of the machine chiefly by reason of its absorbing heat from the vapor. The presence of any substantial amount of moisture in the steam is objectionable in any type of turbine; but the objection becomes greater where more than a single stage is employed. As the bucket-wheel rapidly revolves, it sets the vapor within the shell or casing into rotary motion, and more or less of the moisture in the vapor is discharged by the wheel. A part of this moisture is discharged through the clearances between the relatively moving buckets, and the remainder is discharged or blown from the working passage between the wheel-buckets. The moisture thus discharged is afterward entrained and swept along with the vapor, and it then passes through the nozzle or nozzles into the succeeding stage. The smoother the interior surfaces of the casing or shell are, other things being equal, the greater will be the tendency for the mass of steam and water to whirl around with the wheel.

I have discovered that the greater part of the moisture discharged by the wheel or wheels can be separated from the steam or other vapor, providing such separation is arranged to take place at a point somewhat out of the influence of the whirling mass of vapor. To accomplish this, I provide a separator or separators at the point or points where water and steam are discharged from the wheel. I find it desirable to place these separators wherever water is discharged from the wheel, since it is advantageous to separate the water from the vapor as soon as possible, so as to prevent reëvaporation. To state the matter in a different way, there is more or less moisture in the steam, which is undesirable, and the present invention has for its object to provide suitable means for separating it from the vapor as fast as it is formed. The separator can with advantage be used in all stages, except possibly the last, where it is connected to a condenser. The separator comprises a stationary structure having one or more dead spaces or pockets, which are so arranged and shaped that they catch and retain the water thrown from the wheel either by centrifugal force or by the residual velocity of the motive fluid, or both. The water entering the spaces or pockets is thereby freed from contact with the whirling mass of vapor and runs downward undisturbed into suitable drains. These drains are arranged to carry the water or other liquid from one stage into the next or they may be piped to a common receiver. I prefer to have the drain or drains from one stage or shell empty into the next, as in this manner the heat contained in the water is utilized in forming a small amount of steam in the succeeding shell of lower pressure and in preventing condensation due to cooling. The drains between one stage and the next or between each stage and a receptacle, where such a structure is used, may be open at all times or provided with valves or automatic traps to prevent the escape of steam.

In one embodiment of my invention the separator is provided with projections or ribs, preferably arranged parallel with the wheel-axis and so placed and inclined that the water thrown from the wheel or wheels through the clearances will readily enter the dead spaces or pockets between them. Owing to the large number of ribs or projections employed, which more or less surround the wheel or wheels, the whirling body of steam kept in motion by the moving wheel is confided to a certain space, which space is defined as to its external dimension by the edges of the ribs or projections on the separator, and beyond this space the water separated from the mass is collected.

Owing to the use of intermediate buckets, which are secured to a support that is mounted on the wheel-casing, it is necessary to slightly modify that portion of the separator situated adjacent thereto, although the principle of providing a dead-space wherein the water is unaffected by the moving mass of vapor is preserved. The intermediate buckets are arranged in rows and carried by an open-work ribbed support. Situated between the rows of intermediate buckets and out of engagement with the wheel-buckets are strips of metal curved concentrically with the wheel, and between these strips and the stationary bucket-supports are openings situated in line with the clearances between buckets. Back of the strips are formed dead-spaces wherein the water projected through the clearances is removed from the influence of the wheel and is allowed to flow undisturbed into a drain.

Specific mention has been made only regarding the water discharged centrifugally through the clearances between relatively movable buckets; but there is in addition to this a certain amount of water, which is discharged from the last row of wheel-buckets in each stage. In order to separate this from the steam before it has an opportunity to enter the nozzle or nozzles and pass into the adjacent stage of lower pressure, I place a part or section of the separator at about right angles to the wheel-shaft and adjacent to the discharge side of the wheel-buckets. The residual velocity of the steam blows the water into the dead-spaces formed between the ribs, and as soon as it passes the edge of the ribs adjacent to the buckets the whirling effect thereon due to the wheel ceases and the water flows quietly into the proper drain or drains. Where high economy in operation is especially desired, both sections of my improved separator may be used, but where the requirements are not so severe one section only may be used. The arrangement of the separator will naturally differ somewhat with different machines, but the principle of operation will remain the same.

The invention is illustrated in connection with a jet turbine of the axial flow type, because it has great utility in connection therewith; but its use is not limited thereto, for it can be employed with other kinds of jet machines and also with other types of turbines, and this irrespective of the propelling medium.

Figure 5:
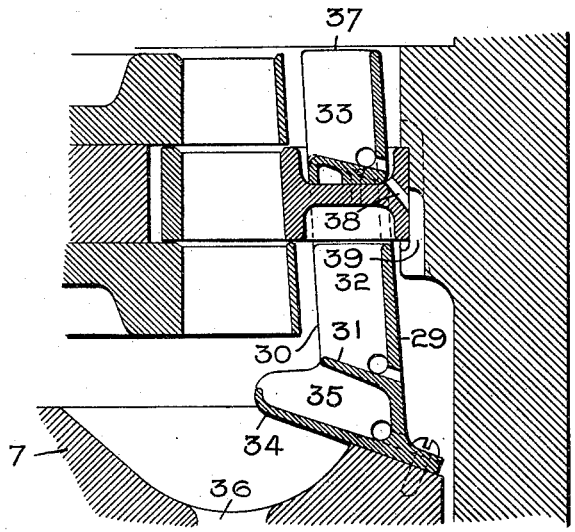

In the accompanying drawings, which illustrate two embodiments of my invention, Figure 1 is a partial vertical section of a vertical turbine. Fig. 2 is a perspective view of one section of the separator. Fig. 3 is a perspective view of a second section of the separator. Fig. 4 is a partial plan view of a turbine, showing the relation between the sections of the separator; and Fig. 5 is a vertical section of a form of separator wherein both sections are combined in a single unit.

1 represents a wheel which is provided with one or more rows of buckets 2. Where more than a single row of buckets is employed, intermediate buckets 3 are provided which receive elastic fluid from one row of buckets and after reversing its direction deliver it to an adjacent row. The intermediate buckets cover any desired arc of the wheel and are carried by a support 4, which is provided with as many ribs 5 as there are rows of buckets. The support is provided at its outer end with a flange, which is secured to the shell or casing 6 by bolts. The wheel and intermediate buckets are both provided with covers, and the clearance between the moving parts is made as small as possible consistent with good operation. Situated below the wheel and supported by the casing is a diaphragm 7 of suitable construction. This diaphragm acts to separate one stage from the next in a multistage turbine. For simplicity of illustration the details of the other stage or stages have been omitted; but they are similar in construction to the one above described. Formed in the diaphragm is a passage 8, which delivers fluid to a nozzle 9, situated directly underneath. This nozzle may be of the expanding or non-expanding type, as is desired, and is employed to deliver motive fluid to the wheel-buckets. Situated directly over the passage and arranged to move back and forth is a valve 10, by means of which the admission of fluid from one stage to the next can be controlled. The valve is provided with an actuating-rod 11, that is moved by suitable means.

As the wheel rotates it imparts rotary motion to the mass of vapor within the shell or casing 6, and in order to separate the moisture from the vapor instead of permitting it to whirl around the wheel and finally enter the adjacent stage through its nozzle a separator is provided, which is located between the ends of the wheel-buckets and the casing or shell. The construction is best shown in Figs. 2 and 4. Referring to these figures, 12 represents a curved plate or support, and carried thereby are ribs or projections 13. These ribs can be made detachable or formed integrally with the plate, as desired. In the present illustration the plate 12 is made of sheet metal, and the ribs 13 are also formed of sheet metal bent in the form of a U and secured to the plate by rivets 14, as shown in the lower portion of the figure. Each of these ribs or projections is inclined to a radius drawn from the wheel-axis, so that moisture in the form of small particles projected from the wheel under centrifugal force will be caught and permitted to trickle down undisturbed into a suitable drain. In other words, the disposition of the ribs is such that dead spaces or pockets 15 are formed between them, in which the water or other liquid projected from the wheel is practically removed from the fan-like action due to the rotating member or members of the turbine.

Situated between the back plate of the separator and the casing is a number of strips 16, which act as supports for the separator and at the same time maintain a space 17 between it and the surrounding casing. The object of this space is to permit the water discharged from the wheel to flow freely through the stage without being drawn into the mass of vapor whirling with the wheel. If desired, however, this space or passage 17 can be omitted and the plate 12 attached directly to the casing. In this event the water would run down the inside of the plate instead of the outside. Each part of the separator is preferably made up in relatively small pieces or sections for convenience in manufacturing and assembling, and the said pieces when assembled in place may extend entirely around the wheel or around a portion only. The farther around they extend, however, the greater will be their effective action in separating moisture from the vapor.

Owing to the fact that the intermediate buckets are removable from the outside of the casing, the separator has to be cut away to receive them. This is best shown in Fig. 2. Situated just below the intermediates is a horizontally-extending shelf 18, which receives water from the wheel and discharges it into the dead-space 17, formed in back of the separator. Between the ribs 5, which support the intermediate buckets, are thin strips 19, which are separated from the ribs by small openings, through which water is discharged due to the centrifugal action of the wheel. The water thus discharged enters the dead-space in back of the curved strips 19 and is directed by the shelf 18 into the fluid-carrying passage 17, which also forms a dead-space.

In order to separate the moisture from the vapor that passes through the working passage between the buckets, a second separator-section is provided of the character best shown in Figs. 3 and 4. In these figures 20 represents the base or main portion of the separator, and it is provided with an upturned flange at one end and a downturned flange at the other end when viewed in cross-section. The main body of the separator is inclined downward slightly, so that water or other liquid caught thereby will flow downward toward the vertical wall of the casing. Carried by the base 20 is a plurality of ribs or projections 21, between which are formed spaces or pockets 22, which collect the water that is separated from the steam by the ribs and discharge it into a suitable drain. The separator is supported by U-shaped pieces 23, that are attached to the diaphragm 7. Between the vertical portion of these supports and the valve 10 is a sheathing 24, which prevents the liquid discharged by the sections of the separator from working back into the steam space or portion adjacent to the wheel. The sheathing is cut away to receive the projection on the diaphragm containing the passage 8. 25 represents a casing situated above the diaphragm for receiving a body of heat-insulating material and protecting the same from the hot water discharged by the sections of the separator.

In order to prevent the water from reëntering the steam, it is necessary to provide means for directing its flow from one place to another. Such a means is formed by the drain 26, which communicates with a depressed portion in the diaphragm 7. From the point where the drain 26 connects with the bowl 27 the wall of the diaphragm rises to a point directly underneath the fluid-carrying passage 17. From this it will be seen that both sections of the separator discharge their contents into a common drain. The passage of hot water or hot water and steam from one stage to the next is controlled by the valve 28, which may be operated in any suitable manner. In the present embodiment of the invention the valve may be left open all the time, and by making the drain 26 of relatively restricted cross-section the losses due to escaping steam at this point will be negligible.

One or both sections of the separator can be used, as desired, and in using the term "separator" in the claims it is to be interpreted as including such use. In other claims the term "sections" is employed where the subdivisions of the separator are meant.

Referring to Fig. 4, the intermediate bucket-support has been removed; but the opening through the casing is clearly shown, as are also the vertically-extending fluid-carrying passages 17. The angular relation of the ribs or projections on the vertical section of the separator is clearly shown. In dotted lines the passages 8 for conveying vapor to an adjacent stage are shown. The character and form of the shelf 18 are also well illustrated.

In Fig. 5 I have shown a separator which combines the functions of the two sections of the separator referred to in connection with the previous figures. In this figure, 7 represents the diaphragm with a nozzle 36 formed therein, and mounted on the inclined face of the diaphragm is a cast-metal separator comprising a plate 29, that has vertical ribs 30 and horizontal ribs 31 formed on the side adjacent to the wheel. Between the ribs are formed dead spaces or pockets 32 and 33, which collect the water separated from the vapor and discharged through the clearances between the relatively movable buckets. The horizontal ribs are inclined downwardly, so that the water will run down the back side of the support into a suitable drain. The portion of the plate 29 which engages with the diaphragm is somewhat elongated, as shown at 34, and between this elongation and the adjacent horizontal rib are chambers or dead-spaces 35, which extend under the wheel-buckets on the discharge side for more or less of their length. By reason of this arrangement the discharged particles of water, due partly to the residual velocity of the steam and partly to the centrifugal force of the revolving elements, are collected and discharged into the drain.

Owing to the fact that the intermediate bucket-support occupies the same angular position as the separator, the latter is slotted to receive the former and the space above the support filled in by the piece 37. This piece is attached to and is removable with the intermediate support and is provided with an opening which communicates with a drain 38 in the intermediate bucket-support. The drain 38 communicates with a groove 39, formed in the outer casing or shell, and from this point water drains into the second shell or into a separate receptacle.

What I claim as new, and desire to secure by Letters Patent of the United States, is—

1. An elastic-fluid turbine comprising relatively moving buckets and an inclosing casing, in combination with a separator located within the casing, which separates the moisture from the mass of vapor moving with and discharged from the buckets.

2. An elastic-fluid turbine comprising relatively moving buckets and an inclosing shell, in combination with a dead space or pocket which receives the liquid particles discharged from the buckets and separates them from the vapor.

3. An elastic-fluid turbine comprising relatively movable buckets, in combination with a dead space or pocket into which liquid particles are projected by the buckets and separated from the vapor, and a drain for the space or pocket.

4. An elastic-fluid turbine comprising relatively moving buckets and an inclosing casing or shell, in combination with a separator situated adjacent to the buckets and provided with a dead space or pocket which receives and separates moisture from the mass of vapor moving with the buckets.

5. An elastic-fluid turbine comprising relatively moving buckets and an inclosing casing or shell, in combination with a separator situated adjacent to the buckets and provided with a dead space or pocket which receives and separates the moisture from the mass of vapor moving with the buckets, and a drain for the separator.

6. An elastic-fluid turbine comprising relatively moving buckets and an inclosing casing or shell divided into stages, in combination with a separator situated adjacent to the buckets and provided with dead spaces or pockets which receive and separate the moisture from the mass of vapor moving with the buckets, and a means for draining the hot water or other liquid caught by the separator into an adjacent shell of lower pressure.

7. An elastic-fluid turbine, comprising buckets which are relatively movable and an inclosing casing, in combination with a separator provided with a ribbed surface which is presented to the mass of vapor moving with the wheel.

8. In an elastic-fluid turbine, the combination of an inclosure or shell with buckets mounted therein which are movable with respect to each other and which tend to maintain the vapor in rotary motion within the inclosure or shell, a separator which acts on the whirling mass of vapor and separates moisture therefrom, and a drain for discharging the moisture collected by the separator.

9. An elastic-fluid turbine including a casing and wheel and stationary buckets, in combination with a separator comprising a plurality of dead spaces or pockets, and a means for securing the separator to a fixed support and separating it therefrom so as to form a fluid-carrying space, which is out of the influence of the mass of vapor moving with the wheel.

10. An elastic-fluid turbine including a casing and wheel and stationary buckets, in combination with a separator comprising a plate which surrounds more or less of the wheel, a means for securing the plate to a stationary support, and a plurality of ribs or projections on the plate, each of which is inclined with respect to a radius so as to catch the liquid particles thrown from the wheel-buckets.

11. An elastic-fluid turbine comprising relatively movable buckets and a casing therefor, in combination with a separator located adjacent to the discharge side of the buckets for separating the liquid from the vapor.

12. An elastic-fluid turbine comprising relatively movable buckets and a surrounding casing, in combination with a separator located adjacent to the discharge side of the wheel-buckets and comprising a plate which extends in the same general direction as the wheel, and a plurality of dead spaces or pockets.

13. An elastic-fluid turbine comprising relatively movable buckets and an inclosing casing, in combination with a separator situated adjacent to the discharge side of the buckets, and a support for the separator which secures it in a fixed position and holds it away from a wall of the casing.

14. An elastic-fluid turbine comprising two or more stages, each stage having relatively movable buckets and a device or devices for discharging the fluid from one stage to another, in combination with a separator for separating liquid from the vapor, which separator is located between the buckets and said device or devices.

15. An elastic-fluid turbine comprising relatively movable buckets and an inclosing casing, in combination with a separator-section for separating the water and steam discharged through the clearances, a second separator-section situated adjacent to the side of the buckets for separating the water and steam discharged therefrom, and a drain into which the sections discharge.

16. An elastic-fluid turbine comprising two or more stages, each stage being provided with relatively movable buckets and an inclosing shell, in combination with a separator which separates moisture from the motive fluid, and a drain for discharging the liquid collected by the separator into a shell or chamber of lower pressure.

17. An elastic-fluid turbine comprising two or more stages, each stage being provided with relatively movable buckets and an inclosing shell, in combination with a separator forming dead spaces or pockets, a drain for discharging the liquid collected by the separator into a shell or chamber of lower pressure, and a means for regulating the flow of liquid through the drain.

18. An elastic-fluid turbine of the vertical type comprising a wheel having rows of buckets, intermediate buckets between the rows of wheel-buckets, and a casing, in combination with a vertically-extending separator-section which is situated between the ends of the buckets and the casing, a second separator-section situated adjacent to the discharge side of the wheel-buckets and inclined downward, a drain into which both of the sections discharge, and a means for regulating the flow of liquid through the drain.

19. An elastic-fluid turbine comprising relatively movable buckets and an inclosing casing, in combination with a separator having pockets into which liquid particles are projected due to the centrifugal force of the moving buckets and the residual velocity of the motive fluid.

20. An elastic-fluid turbine comprising relatively moving buckets and an inclosing casing, in combination with a separator comprising a structure which contains pockets or spaces into which the liquid particles are projected by the wheel due to centrifugal force, and other pockets into which the liquid particles are projected due to the residual velocity of the fluid stream.

21. An elastic-fluid turbine comprising relatively moving buckets and an inclosing casing, in combination with a separator comprising a plate which extends in the same general direction as the wheel-axis and is provided with vertically and horizontally extending ribs between which are formed pockets for receiving liquid particles projected from the wheel.

22. In an elastic-fluid turbine, the combination of a casing, wheel and intermediate buckets mounted therein, and a separator for separating moisture from the motive fluid, which has an opening through which the intermediate buckets extend.

23. As an article of manufacture, a separator for an elastic-fluid turbine, comprising a plate having ribs or projections thereon between which are formed spaces or pockets, each of said ribs or pockets being inclined to a radius.

In witness whereof I have hereunto set my hand this 19th day of June, 1903.

WILLIAM L. R. EMMET.

Witnesses:
BENJAMIN B. HULL,
HELEN ORFORD.